No. 669,372. Patented Mar. 5, 1901.
J. L. RITER.
CREAMING CAN.
(Application filed Apr. 2, 1900.)
(No Model.)

Witnesses
G. L. McGie
F. S. Maguire

John L. Riter,
Inventor,
by John B. Thomas & Co.,
Attorneys.

THE NORRIS PETERS CO., PHOTO-LITHO., WASHINGTON, D. C.

United States Patent Office.

JOHN L. RITER, OF BROWNSVILLE, INDIANA.

CREAMING-CAN.

SPECIFICATION forming part of Letters Patent No. 669,372, dated March 5, 1901.

Application filed April 2, 1900. Serial No. 11,138. (No model.)

*To all whom it may concern:*

Be it known that I, JOHN L. RITER, a citizen of the United States of America, residing at Brownsville, in the county of Union and State of Indiana, have invented new and useful Improvements in Creaming-Cans, of which the following is a specification.

The object of this invention is the production of a creaming can or apparatus for the purpose of greatly accelerating the formation of the cream by thoroughly aerating the milk and then subjecting it to the action of cold water.

With the above object in view the invention consists in providing a creaming-can with a pump for injecting air into the bottom of the body of milk in the can, the said pump being so constructed that it may be also employed in introducing cold water into the milk for the purpose of driving the cream to the upper part of the same.

Figure 1:
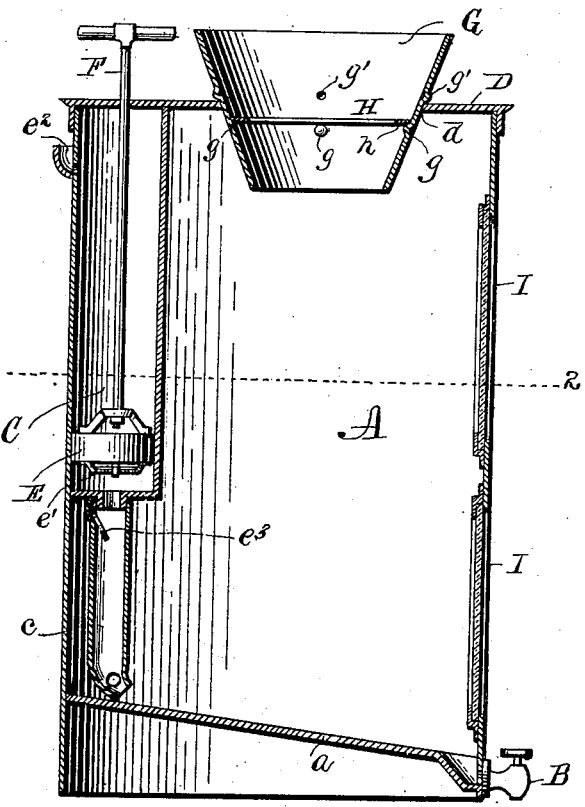
Figure 2:
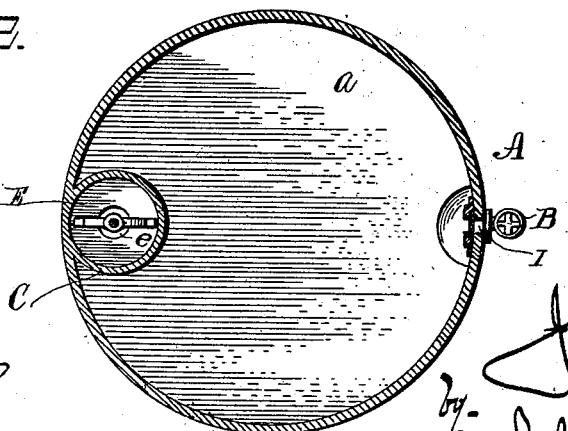

In the accompanying drawings, which form a part of this specification, Figure 1 is a vertical sectional view of a creaming-can constructed in accordance with my invention. Fig. 2 is a horizontal sectional view on the line 2 2 of Fig. 1.

Referring to said drawings, A designates the can, the bottom $a$ of which is located a slight distance above the lower end of its wall, and the said bottom is inclined downwardly to the front wall of the can, at which point is located a draw-off cock B.

Within the upper part of the can, against the rear wall thereof, is located a cylinder C, to the lower end of which is connected a short pipe $c$, terminating a short distance above the highest part of the bottom $a$. This cylinder extends to the upper end of the can and is covered by a cover D, which also forms the cover for the can proper. In the cylinder C works a piston E, having an opening $e$ through the same, which is closed upon the downward movement of the piston by means of a clack-valve $e'$, air being admitted into the upper part of the cylinder through an opening $e^2$. A valve $e^3$ is also located at the upper end of the short tube $c$ to prevent the milk being drawn into the cylinder upon the upward stroke of the piston. The piston is operated by a rod F, which extends upward through a hole in the cover D.

That part of the cover D which forms the top of the milk-chamber is provided with an opening $d$, in which is secured a funnel G to facilitate pouring the milk into the can. The funnel is provided with a removable strainer H, consisting of a piece of wire-gauze reinforced at its edges by a metal binding-strip $h$, and said removable strainer rests upon lugs $g$, stamped inward from the body of the funnel, while lugs $g'$ are stamped outward from the funnel to rest on the cover. This construction provides for readily removing the strainer to clean it, and when said strainer is in place it not only strains the milk, but permits the escape of gases during the formation of the cream and prevents foreign substances from getting into the can. The cover D has a depending flange, which fits over the upper end of the can to hold said cover securely in place.

The can is provided in its front wall with vertical sight openings or gages I for viewing the contents of the can to ascertain the amount of cream which has formed upon the milk.

In the operation of my improved creaming-can a quantity of milk is poured into the can through the funnel G, and then by operating the piston of the pump air is forced into the bottom part of the body of milk and the air-bubbles rising to the top thoroughly aerate the milk and aid in carrying the cream upward. After the milk has been thoroughly aerated water is poured into the cylinder of the pump and forced into the bottom of the can to further assist in the formation of the cream.

By the use of this apparatus cream will more quickly form at the top of the body of milk, as said milk is first quickly and thoroughly aerated and then subjected to the effect of the cold water. After the cream is formed the milk and cream are drawn off in separate receptacles through the cock B.

Having thus described my invention, what I claim as new, and desire to secure by Letters Patent, is—

A creaming apparatus, comprising a can having a bottom inclined downwardly from its rear end, a pump-cylinder located in said can against the rear wall thereof, a short pipe connected to the lower end of the pump-cylinder and having its lower contracted end curved outward and terminating near the upper end of the inclined bottom, a valve located in the upper end of the short pipe and closing against the end of the pump-cylinder, a piston operating in said cylinder, and a cup-shaped opening leading into the upper end of the pump-cylinder through the can, as herein shown and described.

In testimony whereof I affix my signature in presence of two witnesses.

JOHN L. RITER.

Witnesses:
WM. R. HALL,
ALONZO M. KONTNER.